United States Patent
Kunimatsu

(10) Patent No.: US 10,891,087 B2
(45) Date of Patent: Jan. 12, 2021

(54) PRINT SYSTEM, PRINTER AND NON-TRANSITORY COMPUTER-READABLE RECORDING MEDIUM STORING INSTRUCTIONS THEREFOR

(71) Applicant: BROTHER KOGYO KABUSHIKI KAISHA, Nagoya (JP)

(72) Inventor: Akihiro Kunimatsu, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/691,786

(22) Filed: Nov. 22, 2019

(65) Prior Publication Data
US 2020/0174720 A1    Jun. 4, 2020

(30) Foreign Application Priority Data
Nov. 30, 2018  (JP) .................. 2018-224866

(51) Int. Cl.
G06F 15/00 (2006.01)
G06F 3/12 (2006.01)
(Continued)

(52) U.S. Cl.
CPC .......... *G06F 3/1228* (2013.01); *G06F 3/1204* (2013.01); *G06F 3/1261* (2013.01);
(Continued)

(58) Field of Classification Search
CPC ........... H04N 1/00477; H04N 1/00936; H04N 2201/0094
(Continued)

(56) References Cited

U.S. PATENT DOCUMENTS

2011/0302637 A1* 12/2011 Hamada ................ G06F 3/1222
                                                                         726/5
2012/0044523 A1*  2/2012 Kim ...................... G06F 3/1288
                                                                         358/1.15

(Continued)

FOREIGN PATENT DOCUMENTS

JP          2017-134718 A       8/2017

*Primary Examiner* — Douglas Q Tran
(74) *Attorney, Agent, or Firm* — Scully, Scott, Murphy & Presser. PC

(57) ABSTRACT

A print system comprising an information processing apparatus, a printer and a server which are interconnected through a network. When receiving the unprocessed print data from the printer, the server performs, based on the received unprocessed print data, obtaining a transmission source identifying information identifying a transmission source of the unprocessed print data and the information processing apparatus which delivers the unprocessed image data to the printer, applying the image processing, which corresponds to the second identifying information associated with the first identifying information identifying a device same as a device identified by the transmission source identifying information as obtained, to the unprocessed print data, and transmitting processed print data which is the print data to which the image processing has been applied to the printer. When the printer receives the processed print data form the server, the printer performs printing based on the processed print data.

22 Claims, 8 Drawing Sheets

(51) Int. Cl.
  *G06K 1/00* (2006.01)
  *H04L 12/46* (2006.01)
  *H04N 1/00* (2006.01)
(52) U.S. Cl.
  CPC ......... *H04L 12/46* (2013.01); *H04N 1/00482* (2013.01); *G06F 3/1288* (2013.01)
(58) Field of Classification Search
  USPC .............................. 358/1.13, 1.15, 1.14, 1.1
  See application file for complete search history.

(56) References Cited

U.S. PATENT DOCUMENTS

| | | | | |
|---|---|---|---|---|
| 2012/0120438 A1* | 5/2012 | Sato | ...................... | G06F 3/1211 358/1.15 |
| 2012/0307298 A1* | 12/2012 | Ishige | ................... | G06F 3/1267 358/1.15 |
| 2016/0299730 A1* | 10/2016 | Tsunekawa | ........... | G06F 3/1288 |
| 2017/0223210 A1 | 8/2017 | Yamada | | |

* cited by examiner

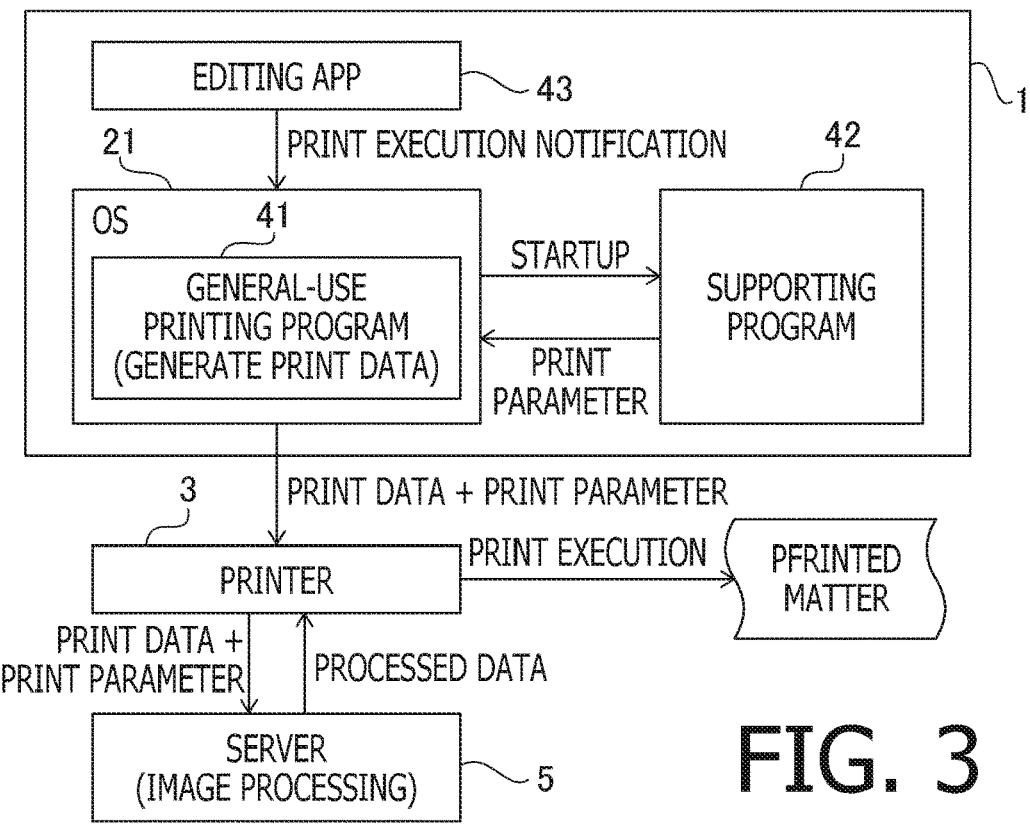

| PC INFORMATION | PROCESS TYPE |
|---|---|
| PC-A | WM-A |
| PC-B | WM-B |

| PROCESS TYPE | PROCESS PROGRAM | IMAGE DATA FOR SYNTHESIZING |
|---|---|---|
| WM-A | PROGRAM A | WM DATA A |
| WM-B | PROGRAM B | WM DATA B |

| 521 | 522 | 523 | 524 | |
|---|---|---|---|---|
| PC INFORMATION | PRINTER INFORMATION | PROCESS TYPE | IMAGE DATA FOR SYNTHESIZING | PROCESS "ON/OFF" INFORMATION |
| PC-A | PRINTER A | WM-A | WM DATA A | ON |
| PC-A | PRINTER B | 4in1 | — | ON |
| PC-B | PRINTER A | WM-B | WM DATA B | ON |
| PC-B | — | — | — | OFF |

FIG. 11

PRINT SYSTEM, PRINTER AND NON-TRANSITORY COMPUTER-READABLE RECORDING MEDIUM STORING INSTRUCTIONS THEREFOR

CROSS-REFERENCE TO RELATED APPLICATIONS

This application claims priority under 35 U.S.C. § 119 from Japanese Patent Application No. 2018-224866 filed on Nov. 30, 2018. The entire subject matter of the application is incorporated herein by reference.

BACKGROUND

Technical Field

The present disclosures relate to a print system, a printer and a computer-readable recording medium storing instructions realizing a supporting program therefor.

Related Art

There has been known a configuration, in accordance with a technique of controlling the printer through a personal computer (PC), of installing a printer driver in the information processing apparatus, generating print data with use of the printer driver and transmitting the generated print data to the printer has been widely known. The printer driver is typically provided by the make of the printer. Such a printer driver is compliant to all the functions the printer has, thereby a user making fully use of the printer.

SUMMARY

Recently, a technique of controlling a printer by means of a printing program standardly implemented in an operating system (OS) without using a printer driver has been realized. According to such a technique, when the OS detects the printer, the OS associates the printer with an OS-standard printing program (i.e., a printing program standardly implemented in the OS). Thereafter, when the OS receives a print instruction to cause the printer to perform printing, it is possible to perform printing with use of the OS-standard printing program.

When printing operations with use of the OS-standard printing program is performed, all the functions of the printer may not be used. For example, there is a printer driver which has image processing functions such as expansion of an image subjected to print or synthesizing of an additional image with an image subjected to print. In contrast, the OS-standard print program may not have the image processing functions as mentioned above. If the printer itself has such image processing functions, it is possible to apply the image processing to image data with use of the image processing functions of the printer. However, it is concerned that a relatively large capacity of memory may be required for such image processing, and whether or not such processing can be successfully performed depends on hardware specification of the printer.

According to aspects of the present disclosures, there is provided a print system having an information processing apparatus, a printer and a server which are interconnected through a network. The server has an image processing function of applying image processing to print data, the image processing being a process of changing a mode of a print image represented by the print data, the print image represented by the print data before the image processing is applied having a first mode, the print image represented by the print data after the image processing is applied having a second mode, the first mode being different from the second mode. The server stores first identifying information and second identifying information in an associated manner, the first identifying information identifying being information identifying at least one of the printer and the information processing apparatus, the second identifying information being information identifying an image processing to be applied. The information processing apparatus connected to the network is configured to transmit unprocessed print data to the printer when a print instruction is received through a printing program, the printing program being a program implemented in an operation system of the information processing apparatus, the print instruction being an instruction causing the printer connected with the information processing apparatus, the unprocessed print data being print data the server has not yet applied the image processing. When the printer connected to the network receives the unprocessed print data from the information processing apparatus, the printer transmits the unprocessed print data to the server. Further, when the server connected to the network receives the unprocessed print data from the printer, the server performs, based on the received unprocessed print data obtaining a transmission source identifying information which identifies a transmission source device, the transmission source apparatus being an information processing apparatus which transmitted the unprocessed image data to the transmission source printer, applying the image processing to the unprocessed print data, the image processing corresponding to the second identifying information, the second identifying information being information stored in the server, the second identifying information being information associated with the first identifying information, the first identifying information being information identifying a device same as the transmission source device identified by the transmission source identifying information obtained by the server and transmitting processed print data to the printer, the processed print data being the print data to which the image processing has been applied. When the printer connected to the network receives the processed print data form the server, the printer performs printing based on the processed print data.

According to aspects of the present disclosures, there is provided a print system, which is provided with an information processing apparatus, a printer, a server, the information processing apparatus, the printer and the server being mutually connected through a network. The server has a processing function of applying image processing to print data, the image processing being a process of changing a mode of a print image represented by the print data, the print image represented by the print data before the image processing applied having a first mode, the print image represented by the print data after the image processing is applied having a second mode, the first mode being different from the second mode. The printer is configured to store first identifying information and second identifying information in an associated manner, the first identifying information being information used to identify the information processing apparatus, the second identifying information being information used to identify the image processing to be applied. The information processing apparatus connected to the network is configured to transmit unprocessed print data to the printer when a print instruction is received through a printing program, the printing program being a program implemented in an operation system of the information processing apparatus, the print instruction being an instruction causing the printer connected with the information processing apparatus, the unprocessed print data being print data the server has not yet applied the image processing. When the printer connected to the network receives the unprocessed print data from the information processing apparatus, the printer obtains transmission source identifying information identifying the information processing apparatus based on the unprocessed print data, the information processing apparatus being a transmission source of the unprocessed print data, adds the second identifying information associated with the first identifying information to the unprocessed print data, the first identifying information being information identifying a device same as a device identified by the obtained transmission source identifying information, and transmits the unprocessed print data to the server, the second identifying information being added the unprocessed print data being data. When the server connected to the network receives the unprocessed print data to which the second identifying information is added from the printer, the server applies the image processing corresponding to the added second identifying information to the unprocessed print data, and transmits processed print data, the processed print data being the print data to which the image processing has been applied. When the printer connected to the network receives the processed print data from the server, performs printing based on the processed print data.

According to aspects of the present disclosures, there is provided a printer configured to be connected to a network. The printer is provide with a communication interface, a printing device and a controller. The controller is configured such that, when the controller receives, through the interface, print data to which process requesting information is added from an information processing apparatus, the information processing apparatus being connected to the network, the controller performs a transferring process, the transferring process being a process of transferring, through the communication interface, the received print data to a server, the server being is connected to the network, the process requesting information indicating application of image processing, the image processing being a process of changing a mode of an image represented by the print data, the image represented by the print data before the image processing is applied having a first mode, the image represented by the print data after the image processing is applied having a second mode, the second mode being different from the first mode. An operating system of the information processing apparatus has a printing program, the printing program being implemented in the operating system in advance. The print data print data is data generated by the printing program in response to the information processing apparatus receiving a print instruction through the printing program, the print instruction being an instruction causing the printer to perform printing. The server has an image processing function of applying the image processing to the print data. The server stores first identifying information and second identifying information in an associated manner, the first identifying information being information identifying at least one of the printer and the information processing apparatus, the second identifying information being information identifying the image processing to be applied. When the server receives the print data from the printer, the server obtains transmission source identifying information, the transmission source identifying information being information identifying at least one of the printer and the information processing apparatus, the printer being a transmission source of the print data, the information processing apparatus being an apparatus supplying the print data to the printer. The server applies the image processing corresponding to the second identifying information. The second identifying information being associated with the first identifying information, the first identifying information being information identifying a device same as the device identified by the transmission source identifying information, the transmission source identifying information being obtained by the server. The controller is further configured such that, when the processed print data is received through the communication interface, the processed print data being data to which the image processing has been applied by the server the controller performs a printing process, the printing process being a process of causing the printing device to perform printing based on the processed print data.

According to aspects of the present disclosures, there is provided a printer configured to be connected to a network. The printer is provided with a communication interface, a printing device, a memory and a controller. The memory is configured to store first identifying information and a second identifying information in an associated manner, the first identifying information being information identifying an information processing apparatus, the second identifying information being information identifying image processing to be applied. The controller is configured such that, when the controller receives print data from the information processing apparatus connected to the network through the communication interface, process requesting information being added to the print data. The controller obtains transmission source identifying information identifying the information processing apparatus based on the print data, the information processing apparatus being a transmission source of the print data, the process requesting information indicating application of image processing, the image processing being a process of changing a mode of an image represented by the print data, the image represented by the print data before the image processing is applied having a first mode, the image represented by the print data after the image processing is applied having a second mode, the second mode being different from the first mode. The controller adds the second identifying information to the print data, the second identifying information being associated with the first identifying information, the first identifying information identifying a device same as the device identified by the transmission source identifying information. The controller performs a transferring process of transferring the print data to a server connected to the network through the communication interface, the second identifying information has been added to the print data. The operating system of the information processing apparatus having a printing program, the printing program being implemented in the operating system in advance. The print data being data generated by the printing program in response to the information processing apparatus receiving a print instruction through the printing program, the print instruction being an instruction causing the printer to perform printing. The server having an image processing function of applying image processing to the print data. The server being configured to apply, in response to receipt of the print data from the printer, the image processing to the print data, the image processing corresponding to the second identifying information added to the print data. The controller is further configured such that, when the processed print data is received through the communication interface, the image processing having been applied to the print data by the server, the controller performs a printing process of causing the printing device to perform printing based on the processed print data.

According to aspects of the present disclosures, there is provided a non-transitory computer-readable recording medium containing instructions realizing a supporting program corresponding to a printer, the printer being connected to an information processing apparatus through a network, an operating system of the information processing apparatus having a printing program as a program implemented in the operating system, the information processing apparatus storing image processing information in a memory of the image processing apparatus, image processing information indicating whether image processing is to be applied to print data, the printer being connected, through the network, to a server having a function of applying image processing, the image processing being a process of changing a mode of a print image represented by the print data, the image represented by the print image data before the image processing is applied having a first mode, the print image represented by the print data after the image processing is applied having a second mode, the second mode being different from the first mode, the printer transferring the print data to the server when process requesting information is added to the received print data, the process requesting information indicating that the image processing is to be applied, the server storing first identifying information and second identifying information in an associated manner, the first identifying information identifying at least one of the printer and the information processing apparatus, the second identifying information identifying the image processing to be applied, the server obtaining transmission source identifying information identifying at least one of the printer and the information processing apparatus, the printer being a transmission source of the print data, the information processing apparatus supplying the print data to the printer when the server receives the print data from the printer, the server being configured to apply the image processing corresponding to the second identifying information, the second identifying information being associated with the first identifying information identifying a device same as a device identified by the obtained transmission source identifying information. The instructions cause, when executed by the controller, the information processing apparatus to perform, when the information processing apparatus receives a print instruction to cause the printer to perform printing through the print program, an obtaining process of obtaining the image processing information from the memory, and when the image processing information obtained in the obtaining process indicates the image processing process, a first adding process of adding the process requesting information to a print parameter of print data corresponding to the print instruction.

According to aspects of the present disclosures, there is provided a non-transitory computer-readable recording medium containing instructions realizing a supporting program corresponding to a printer, the printer being connected to an information processing apparatus through a network, an operating system of the information processing apparatus having a printing program as a program implemented in the operating system, the printer being connected, through the network, to a server having a function of applying image processing, the image processing being a process of changing a mode of a print image represented by the print data, the print image represented by the print data before the image processing is applied having a first mode, the print image represented by the print data after the image processing is applied having a second mode, the second mode being different from the first mode, the printer transferring the print data to the server when process requesting information is added to the received print data, the process requesting information indicating that the image processing is to be applied, the server storing first identifying information and second identifying information in an associated manner, the first identifying information identifying at least one of the printer and the information processing apparatus, the second identifying information identifying the image processing to be applied, the server obtaining transmission source identifying information, the transmission source identifying information identifying at least one of the printer which is a transmission source of the print data and the information processing apparatus, the information processing apparatus supplying the print data to the printer when the server receives the print data from the printer, the server being configured to apply the image processing corresponding to the second identifying information, the second identifying information associated with the first identifying information identifying a device same as a device identified by the obtained transmission source identifying information. The instructions cause, when executed by the controller, the information processing apparatus to perform, when the information processing apparatus receives a print instruction to cause the printer to perform printing through the print program, a receiving process of receiving whether an image processing process is to be applied to print data through a user interface of the information processing apparatus, and when applying image processing is received in the receiving process, a second adding process of adding the process requesting information to a print parameter of print data corresponding to the print instruction.

According to aspects of the present disclosures, there is provided a non-transitory computer-readable recording medium containing instructions realizing a supporting program corresponding to a printer, the printer being connected to an information processing apparatus through a network, an operating system of the information processing apparatus having a printing program as a program implemented in the operating system, the information processing apparatus storing image processing information in a memory of the image processing apparatus, image processing information indicating whether image processing is to be applied to print data, the printer being connected, through the network, to a server having a function of applying image processing, the image processing being a process of changing a mode of a print image represented by the print data, the image represented by the print image data before the image processing is applied having a first mode, the print image represented by the print data after the image processing is applied having a second mode, the second mode being different from the first mode, the server storing first identifying information and second identifying information in an associated manner, the first identifying information identifying the information processing apparatus, the second identifying information identifying the image processing to be applied, the printer obtaining transmission source identifying information identifying the information processing apparatus based on the print data when process requesting information indicating an image processing process is added to the received print data, the information processing apparatus being a transmission source of the print data, the printer adding the second identifying information associated with the first identifying information, the first identifying information identifying a device same as a device identified by the obtained transmission identifying information to the print data, the printer transmitting the print data to the server, the second identifying information being added to the print data. When receiving the print data from the printer, the server applies the image processing corresponding to the added second identifying information to the print data. The instructions cause, when executed by the controller, the information processing apparatus to perform, when the information processing apparatus receives a print instruction to cause the printer to perform printing through the print program, an obtaining process of obtaining the image processing information from the memory, and when the image processing information obtained in the obtaining process indicates the image processing process, a first adding process of adding the process requesting information to a print parameter of print data corresponding to the print instruction.

According to aspects of the present disclosures, there is provided a non-transitory computer-readable recording medium containing instructions realizing a supporting program corresponding to a printer, the printer being connected to an information processing apparatus through a network, an operating system of the information processing apparatus having a printing program as a program implemented in the operating system, the printer being connected, through the network, to a server having a function of applying image processing, the image processing being a process of changing a mode of a print image represented by print data, the print image represented by the print image data before the image processing is applied having a first mode, the print image represented by the print image data after the image processing is applied having a second mode, the second mode being different from the first mode, the server storing first identifying information and a second identifying information in an associated manner, the first identifying information identifying the information processing apparatus, the second identifying information identifying the image processing to be applied, the printer obtaining transmission source identifying information identifying the information processing apparatus based on the print data when process requesting information indicating an image processing process is added to the received print data the information processing apparatus being a transmission source of the print data, the printer adding the second identifying information associated with the first identifying information, the first identifying information identifying a device same as a device identified by the obtained transmission identifying information to the print data, the printer transmitting the print data to the server, the second identifying information being added to the print data, the server applying the image processing corresponding to the added second identifying information to the print data when receiving the print data to which the second identifying information from the printer. The instructions cause, when executed by the controller, the information processing apparatus to perform, when the information processing apparatus receives a print instruction to cause the printer to perform printing through the print program, a receiving process of receiving whether image processing is to be applied to print data through a user interface of the information processing apparatus, and when applying image processing is received in the receiving process, a second adding process of adding the process requesting information to a print parameter of print data corresponding to the print instruction.

BRIEF DESCRIPTION OF THE ACCOMPANYING DRAWINGS

FIG. 2 illustrates an example of information stored in an image processing database.

FIG. 3 illustrates a printing process performed by the print system shown in FIG. 1.

FIG. 4 illustrates an example of information stored in an image process setting data.

FIG. 9 illustrates an example of information stored in a process type setting database according to a third embodiment of the present disclosures.

FIG. 10 illustrates an example of information stored in a process type database according to the third embodiment.

FIG. 11 illustrates an example of information stored in the image processing database according to the third embodiment.

DETAILED DESCRIPTION OF THE EMBODIMENT

Hereinafter, referring to the accompanying drawings, a print system according to a first embodiment of the present disclosures will be described. The print system according to present embodiment includes a personal computer (hereinafter, referred to as a "PC") and a printer.

Figure 1:
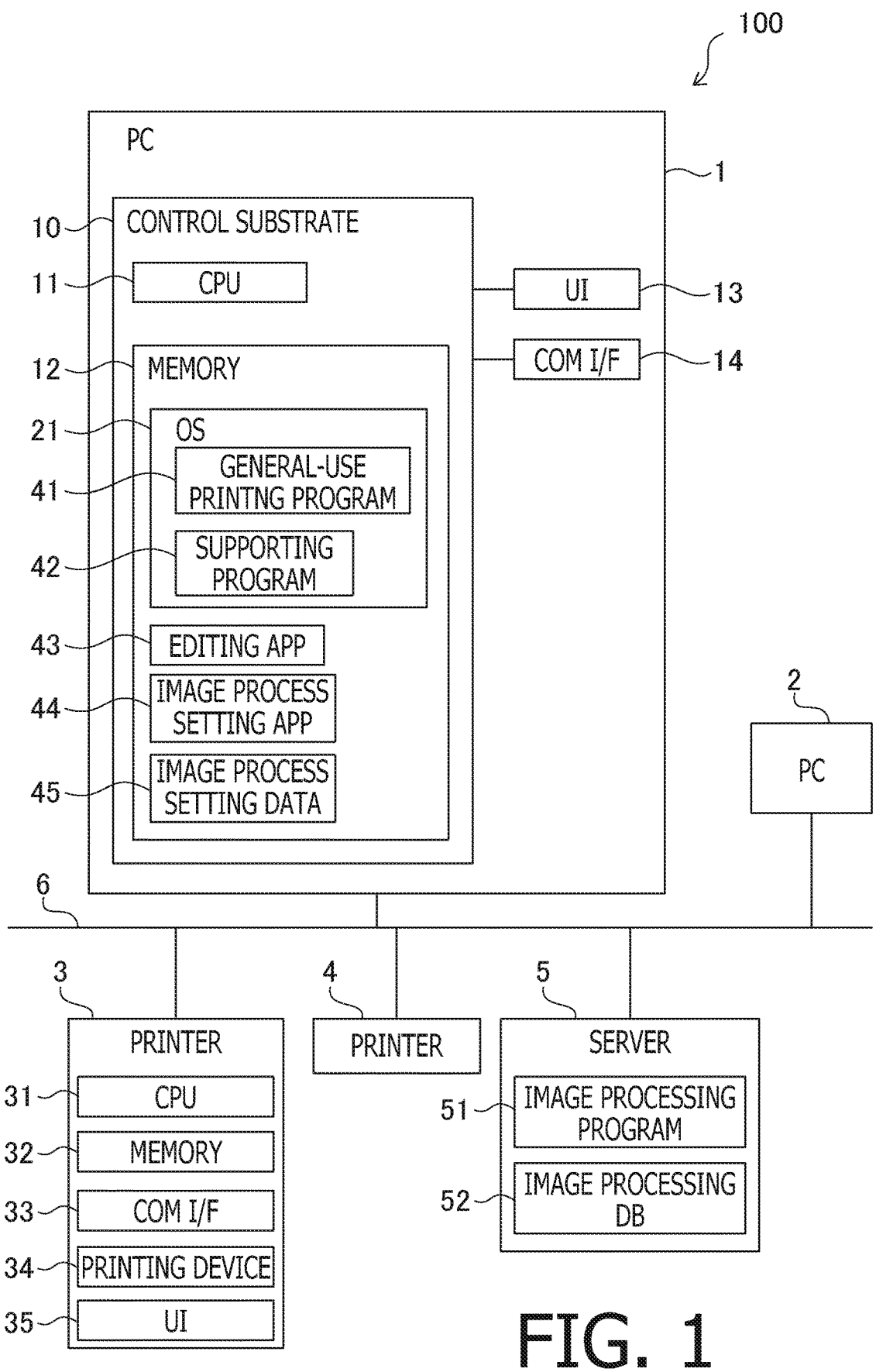
FIG. 1 is a block diagram illustrating an electrical configuration of a print system according to an embodiment of the present disclosures.

A print system 100 according to the present embodiment is a system in which one or more PC's, one or more printers and one or more servers are mutually and communicatably connected. For example, the print system 100 according to the present embodiment includes, as shown in FIG. 1, a PC 1 and a PC 2 (i.e., two PC's), a printer 3 and a printer 4 (i.e., two printers), and server 5 (i.e., one server), which are connected to a network 6. The PC 1 and the PC 2 are examples of an information processing apparatus. It is noted that the PC 1 and the PC 2 have the same configuration, and only the configuration of the PC 1 is described, while the configuration of the PC 2 will be omitted for the sake of brevity.

The PC 1 includes, as shown in FIG. 1, a control substrate 10, a UI 13 and a communication (abbreviated as "COM" in the drawings) I/F 14. The UI 13 and the communication I/F 14 are electrically connected to the control substrate 10.

The UI 13 is configured to display various pieces of information. Further, the UI 13 includes hardware configured to receive user's input of instructions. The UI 13 may be a touch panel having both a displaying function and an input-receiving function, or a combination of a display having the displaying function and a keyboard and/or a mouse having the input-receiving function.

The communication I/F 14 includes hardware for communicating with respective devices of the print system 100 through a network 6. Communication methods of the network 6 may be a network communication 6, a network communication and a USB communication. The communication I/F 14 may include multiple interfaces respectively for different communication methods. For example, the communication I/F 14 may include hardware for communicating with an external device through the Internet or the like.

The control substrate 10 includes, as shown in FIG. 1, a CPU 11 and a memory 12. The memory 12 includes a ROM, a RAM and a non-volatile memory and stores various application programs (hereinafter, referred to as APP's) and various pieces of data. It is noted that the ROM, the RAM, the non-volatile memory and the like are referred to without distinguishing the details thereamong. The CPU 11 performs various processes in accordance with programs retrieved from the memory 12 and/or in accordance with the user's instructions. It is noted that the control substrate 10 in FIG. 1 is a collective name including the hardware and software used for controlling the PC 1. Thus, the term "control substrate" is not intended to represent a single hardware existing in the PC 1. Further, the CPU 11 is an example of a controller.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42, an editing APP 43, an image process setting APP 44 and image process setting data 55. The supporting program 42 is an example of a supporting program. The supporting program 42 is, for example, a hardware support APP (abbreviated as HAS) of which specification is published by Microsoft Corporation. The OS 21 is, for example, Microsoft Windows®, MacOS® or Linux®.

According to the present embodiment, a printer driver for each of the printer 3 and the printer 4 can be installed in the OS 21. It is noted that each of the printer drivers may be or may not be installed to the OS 21. The image process setting APP 44 and the image process setting data 45 will be described later. In the memory 12, in addition to ones shown in FIG. 1, device information regarding connected devices and various programs such as a browser are also stored.

It is noted that processes and process steps of each flowchart described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It should be noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an evet B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

The general-use printing program 41 is an APP to cause a printer (various printers such as the printer 2) to perform printing from the PC 1. The general-use printing program 41 is an OS-standard printing program which is implemented in the OS 21 in advance. The general-use printing program 41 according to the present embodiment is configured to generate print data the printer can use for printing based on image data subjected to be printed. The general-use printing program 41 is an example of a printing program.

The general-use printing program 41 is a general-purpose APP which can be used for any of a plurality of models of printers supplied by various device venders. The general-use printing program 41 is configured to cause any of the plurality of models of printers to perform operations which are commonly implemented in the plurality of models of printers. Alternatively, the general-use printing program 41 may be a program supplied from the device venders to a vender of the OS 21 so that the general-use printing program 41 is implemented in the OS 21 (e.g., a kind of printer driver supplied by a device vender to be implemented in the OS 21).

General-use print data which is generated by the general-us printing program 41 is data which can be commonly used for various models of printers. That is, the general-use print data is data which is independent from the model of the printer. The general-use printing program 41 does not receive a print setting intrinsic to a particular printer. Further, the general-use printing program 41 does not correspond to a process of adding a watermark (hereinafter, referred to as WM) or printing with processing a mode of the image data (e.g., printing of an N-up printing).

Programs developed by respective venders of the devices after the general-use printing program 41 to be implemented in the OS 21 has been supplied to the vender of the OS 21 can be added to the PC 1 by installing the same. In the following description, printer drivers which can be added to the PC 1 by installation (i.e., not the program which has been implemented in the OS 21) will be simply referred to as the "printer drivers" or "vender drivers." In other words, the "printer driver" is not the program which has been implemented in the OS 21 in advance but a program which needs to be installed in the OS 21 according to a particular process in order to user the same. For example, an installer designated through the UI 20 or the OS 21 installs the printer driver in the OS 21. The printer drivers are prepared by the venders of the printers so as to correspond to respective models of the printers. Thus, a printer driver corresponding to a particular printer may be configured to receive instructions to perform functions which are intrinsic to the particular printer.

There may be a case where the printer driver, or the vender driver exhibits a higher performance than the general-use program 41 implemented in the OS 21 in advance. For example, the print data generated by the printer driver may be processed more efficiently by the printer than the print data generated by the general-use printing program 41, and thus, a printing speed of the image data generated by the printer driver may be faster than the printing speed of the image data generated by the general-use printing program 41. The print data generated by the printer driver may cause the printer to print a printed matter having a better color developing property than the print data generated by the general-use printing program 41. The print data generated by the printer driver may cause the printer to print a printed matter having a higher printing resolution than the print data generated by the general-use printing program 41. Further, the printer driver may instruct the printer to perform a function intrinsic to the printer which cannot be instructed by the general-use printing program 41. In this case, the function intrinsic to the printer may include, for example, a mirror-reversed printing function and a black/white inversion printing function.

The supporting program 42 is a program which performs processes based on the instruction by the OS 21 in association with the startup of the general-use printing program 41 and supports controlling of hardware subjected to the instruction. The supporting program 42 is started, for example, by the OS 21. The supporting program 42 is an APP corresponding to a model of the printer, which is subjected to be controlled. Typically, the supporting program 42 is prepared by the vender of the device (e.g., the printer) subjected to be controlled. Generally, the vender of the device registers the supporting program 42 with a platform supplied by the vender of the OS 21 in accordance with a procedure designated by the vender of the OS 21. When a printer is newly connected to the PC 1 and the supporting program corresponding to the printer is registered with the platform, the OS 21 downloads the supporting program 42 from a sever in which the supporting program 42 is stored and incorporates the same in the PC 1.

In the PC 1 to which a plurality of models of printers can be connected, supporting programs respectively corresponding to the plurality of models of printers are installed, and information associating the respective printers with the respective supporting programs is stored in the memory 12. That is, identifying information of each of the supporting programs is stored in association with the printer information of each printer. According to the present embodiment, the supporting program 42 is the supporting program commonly used for the printer 3 and the printer 4. If different supporting programs are to be used for the printers 3 and 4, respective supporting programs should be stored in the memory 12.

The editing APP is, for example, an APP for generating and/or editing image data and document data. Examples of the editing APP 43 are Microsoft Word® and Power Point®. The editing APP 43 is configured to receive a user operation including an instruction to cause the printer 2 to perform a particular operation. For example, the editing APP 43 is configured to receive a print instruction which causes the printer 3 or printer 4 to perform printing through the UI 13.

The printer 3 according to the present embodiment has, as shown in FIG. 1, a CPU 31, a memory 32, a printing device 34 and a UI 35. The printer 4 has the same configuration as those of the printer 3. The CPU 31 is an example of a controller of the printer. The CPU 31 performs respective processes in accordance with programs retrieved from the memory 32 and/or user instructions.

The memory 32 includes a ROM, a RAM and a non-volatile memory and stores various programs and various pieces of data. The communication (abbreviated as "COM" in the drawings) I/F 33 includes hardware for communicating with various devices/components of the print system 100 through the network 6. The printing device 34 has a configuration which prints an image on a printing medium based on the print data. A printing method employed by the printing device 34 may be any method such as an inkjet method or an electrophotographic imaging method. The UI 35 includes hardware which is configured to display various pieces of information and receive user's instructions.

The server 5 according to the present embodiment is a device includes a CPU and a memory. As shown in FIG. 1, the server 5 contains an image processing program 51 and an image processing DB 52. The image processing program 51 is a program for applying various types of image processing to the print data. The server 5 is a device having image processing functions which are achieved by executing the image processing program 51. It is noted that the image processing applied to the print data by executing the image processing program 51 is an example of image processing.

The server 5 has at least one of programs for WM synthesizing process, the N-up (N-in-One) process and a poster printing process as the image processing program 51. The WM synthesizing process is a process of synthesizing a WM image with the print data and is an example of a synthesizing process. The WM image is an image which is synthesized with the print data and printed, for example, in order to prevent leak of information. The WM image may be an image of a particular character string (e.g., "Confidential"), an image of particular information such as a date, a particular image (e.g., a corporation logo) and the like. The N-up process is a process of printing images of a plurality of pages in one page in a reduced and collected manner, and is an example of an aggregation process. The poster printing process is a process of dividing an image for one page into a plurality of divided images and printing the same on a plurality of sheets in a magnified manner, and is an example of a dividing process.

The image processing by the image processing program 51 is for processing the image subjected to print. The printed image which is printed based on the processed print data exhibits different mode in comparison with the printed image printed based on the print data before processed. The image processing is a process subjected to the image data and for modifying the mode of the printed image. That is, the image processing does not include processes such as a file format converting process which does not change the mode of the printed image.

The image process DB 52 stores, as shown in FIG. 2, the PC information 521, the printer information 522, the process type 523 and the image data for synthesizing 524 in a mutually associated manner. The PC information 521 is information identifying PC's which provide the print data to the printer and includes, for example, names of respective PC's, IP addresses, MAC addresses or serial numbers. The printer information 522 is information identifying printers performing printing and information identifying transmission sources of the print data. The printer information 522 includes, for example, names of the respective printers or IP addresses. The PC information 521 or the printer information 522 is an example of first identifying information, and the process type 523 is an example of second identifying information.

The "process type" 523 (see FIG. 2) is information indicating types of image processing performed by the server 5. The "image data for synthesizing" 524 is information to be synthesized with the image represented by the image data when the image processing is the WM synthesizing process. The "image data for synthesizing" 524 may be image data or information indicating a stored location of the image data to be synthesized.

In the print system 100 according to the present embodiment, the PC 1 is configured such that the editing APP 43 receives the print instruction through the UI 13. Then, the editing APP 43 which has received the print instruction delivers, as shown in FIG. 3, a print execution notification to the OS 21 based on the received print instruction. The print execution notification includes, for example, information indicating the printer which is designated by the print instruction, the print parameter and image data designated by the print instruction.

Next, when the printer designated by the print instruction is the printer 3, and when the supporting program corresponding to the printer 3 is stored in the memory 12, the OS 21 instructs the supporting program 42 to perform a process in accordance with the supporting program 42 before generation of the print data with use of the general-use printing program 41 is started.

The supporting program 42 includes a pre-process to be performed before the process by the general-use printing program 41 is started and a post-process to be performed after the process by the general-use printing program 41 is finished and before the print data is transmitted to the printer 3. In the following description, the supporting program 42 will be described to perform a pre-process which is performed before generation of print data with use of the general-use printing program 41. However, instead of the pre-process, a similar process may be performed after generation of the print data with use of the general-use printing program 41 and before transmission of the thus generated print data to the printer 3.

The PC 1 adds various pieces of information in order to enable the image processing by the server 5 to the print parameter by executing the supporting program 42, and transmits the print parameter, to which the information has been added, and the generated print data to the printer 3. Details of the information added by the PC 1 will be described later. It is noted that the print data transmitted at this stage is an example of unprocessed print data.

The printer 3 according to the present embodiment is configured such that, when the printer 3 receives the print parameter and the print data, the printer 3 transmits the print parameter and the print data to the server 5 based on the information added to the print parameter. When the server 5 receives the print data from the printer 3, the server 5 refers to the image process DB 52 based on the information added to the print parameter and applies the image processing indicated in the image process DB 52 to the received image data.

In the example shown in FIG. 2, when the server 5 receives the print data generated by the PC of which name is "PC-A" from the printer of which name is "PRINTER A," the server 5 performs the WM synthesizing process of synthesizing the image designated by "WM DATA A" with the print data. In this case, a combination of the printer information and the PC information is an example of transmission source identifying information. The server 5 transmits processed data which is data after processed to the printer 3. The processed data is an example of processed print data. The printer 3 performs printing based on the processed data received from the server 5.

Before performing the printing operation shown in FIG. 3, the server 5 sets information to be stored in the image process DB 53 based on the information received from the respective PC's. The PC 1 receives, for example, the user setting through the UI 13 with use of the image process setting APP 44 shown in FIG. 1, and transmits the received setting information to the server 5. The image process setting APP 44 is a program which transmits information on image processing which is set based on the user designation to the server 5 to cause the image process DB 52 to store the same in the image process DB 52 and in the image process setting data 45 of the PC 1. Before inputting the print instruction, the user sets respective pieces of information for the image process setting data 45 and the image process DB 52 of the server 5 by executing, in advance, the image processing APP 44 to input the respective pieces of information.

The image process setting data 45 which is set by the image process setting APP 44 stores, for example, as shown in FIG. 4, the printer information 451, process "ON/OFF" information 452 and server information 453 in a mutually associated manner. The printer information 451 is information identifying the printers, and is a name of the printer or the IP address. The process "ON/OFF" information 452 is information indicating whether or not the image processing is to be performed. The process "ON/OFF" information 452 is an example of the process execution information.

The server information 453 is information for identifying a server which is caused to perform the image processing, and includes a name of the server or the IP address. By providing the server information 453, when a plurality of servers is connected to the PC 1, even if the same printer is used from the same PC, different image processing can be set for respective servers. It is noted that when only a single server is available, the server information 453 may be omitted. In such a case, the printer may store, in advance, the server information identifying the single server.

Figure 5:
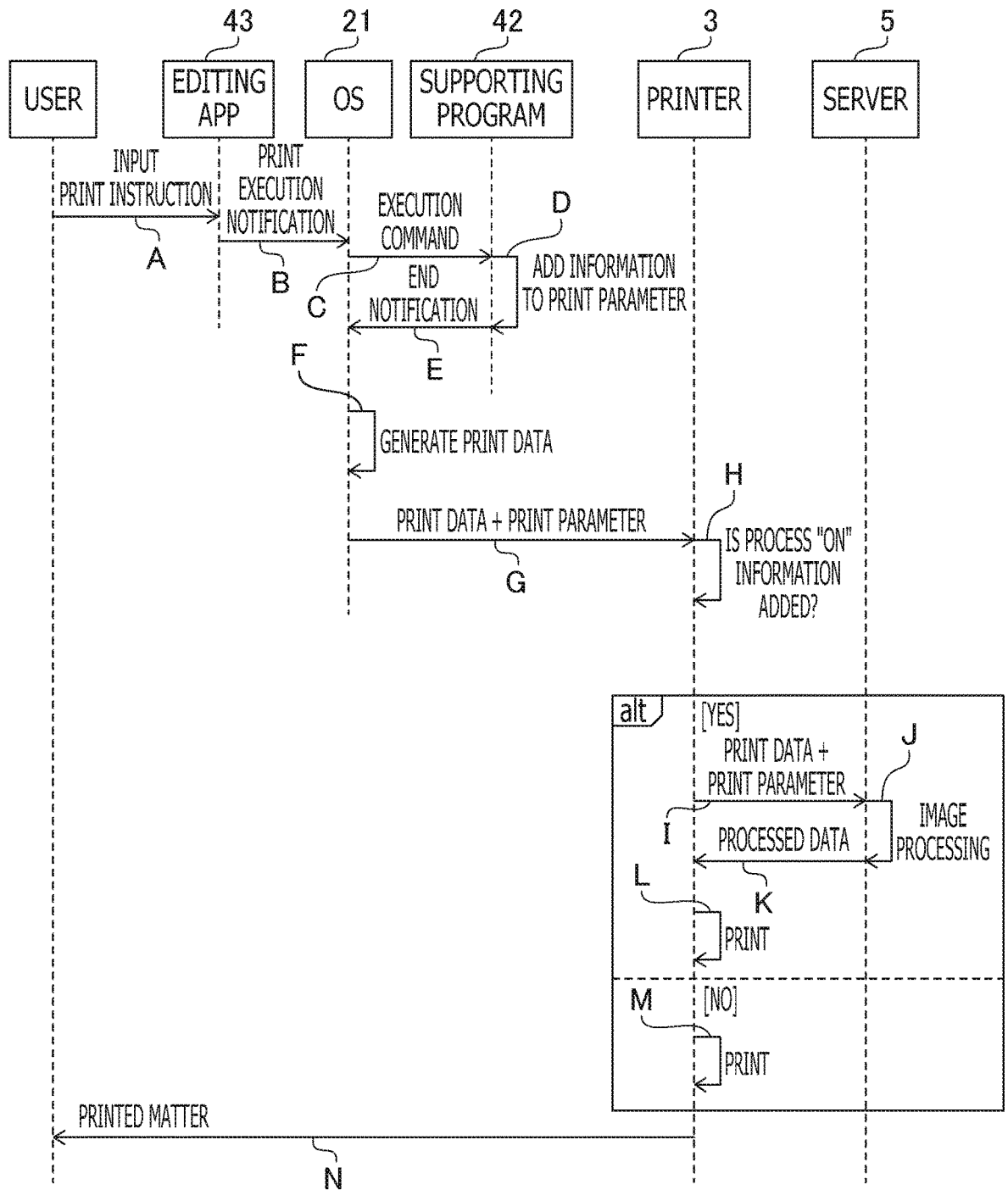
FIG. 5 is a sequence chart illustrating an example of an operation of each program.

Next, operations of respective programs which are executed when printing is performed by the print system 100 according to the present embodiment will be described with reference to a sequence chart shown in FIG. 5. FIG. 5 shows an example of the operation when the print instruction to cause the printer 3 to perform printing with use of the general-use printing program 41 based on the image data edited by the editing APP 43.

When the editing APP 43 receives designation of the image data subjected to print and input of an instruction to execute printing through the UI 13 (arrow A), the editing APP 43 delivers a print execution notification to OS 21 (arrow B). It is noted that the editing APP 43 delivers the image data subjected to print and the print parameter including designation of the printer 3 which is the printer to perform printing to the OS 21 at arrow B.

The OS 21 identifies the printer 3 which is designated as the device to perform printing based on the print parameter included in the print execution notification. For example, when it is designated that the printer 3 performs printing using the general-use printing program 41, if the supporting program 42 corresponding to the printer 3 is implemented, the OS 21 outputs an execution command to execute the process in accordance with the supporting program 42 (arrow C). It is noted that output of the execution command by the OS 21 is an example of a detection notification of the print instruction.

The supporting program 42 refers to the process "ON/OFF" information 452 of the image process setting data 45, determines whether printing process it to be performed by the printer 3. When it is determined that the image processing is to be performed, the supporting program adds information indicating the image processing to be performed, the server information and the PC information (arrow D). In the following description, information indicating execution of the image processing will be referred to as process "ON" information. The process "ON" information is an example of process requesting information.

The server information is for identifying a server which is to perform the image processing when printing by the printer 3 is performed based on the server information 452 included in the image process setting data 45. The PC information is for indicating the PC itself. For example, the PC information includes a name of the PC, the IP address, the MAC address or the serial number of the PC. The supporting program 42 obtains the PC information from, for example, the OS 21. Further, the supporting program 42 notifies the end of process to the OS 21 (arrow E).

The OS 21 generates the print data based on the image data with use of the general-use printing program 41 (arrow F), and transmits the generated print data and the print parameter to which the information has been added by the supporting program 42 to the printer 3 (arrow G).

The printer 3 determines whether the process "ON" information has been added to the received print parameter (arrow H). When it is determined that the process "ON" information has been added, the printer 3 refers to the server information included in the print parameter and transfer the print data and the print parameter to the designated server 5 (arrow I).

The server 5 refers to the image process DB 52 based on the information of the printer 3, which is the transmission source of the received print data, and the print parameter added to the print data, and executes the image processing designated by the process type 523 corresponding to the PC information and the printer information (arrow J). Further, the server 5 transmits the processed data to the printer 3 (arrow K). Then, the printer 3 performs printing based on the received processed data (arrow L).

When it is determined that the process "ON" information has not been added to the received print parameter, the printer 3 performs printing based on the print data received at arrow G (arrow M). As above, at arrow L or arrow M, the printed matter is generated (arrow N).

Next, referring to a flowchart shown in FIG. 6, the printing process according to the print system 100 will be described. The printing process is performed such that the editing program 43 receives the print instruction, which is an instruction to cause the printer 3 or the printer 4 to perform printing with use of the general-use printing program 41, through the UI 13 (arrow A of FIG. 5), and in response to the OS 21 of the PC 1 receiving the print execution notification from the editing APP 43 (arrow B), the printing process is executed by the OS 21. In the following description, it is assumed that the printer 3 is designated as a printer to perform printing and the sever 5 is designated as a sever to perform the image processing for the sake of explanation.

In the printing process, the OS 21 initially obtains information indicating the printer 3 as the printer designated as the printer to perform printing (S101). In S101, the OS 21 obtains the printer information which the OS 21 has, and obtains, for example, the name of the printer 3 and the IP address thereof.

Then, the OS 21 determines whether there exists the supporting program 42 corresponding to the printer 3 (S102). It is noted that the OS 21 determines the availability of the supporting program 42 based on the information the OS 21 possesses. When it is determined that there exists the supporting program 42 corresponding to the printer 3 (S102: YES), the OS 21 outputs an execution command to the supporting program 42 to start the process in accordance with the supporting program 42 (S103, arrow C in FIG. 5). Thus, the CPU 11 performs the pre-process in accordance with the supporting program 42.

Figure 7:
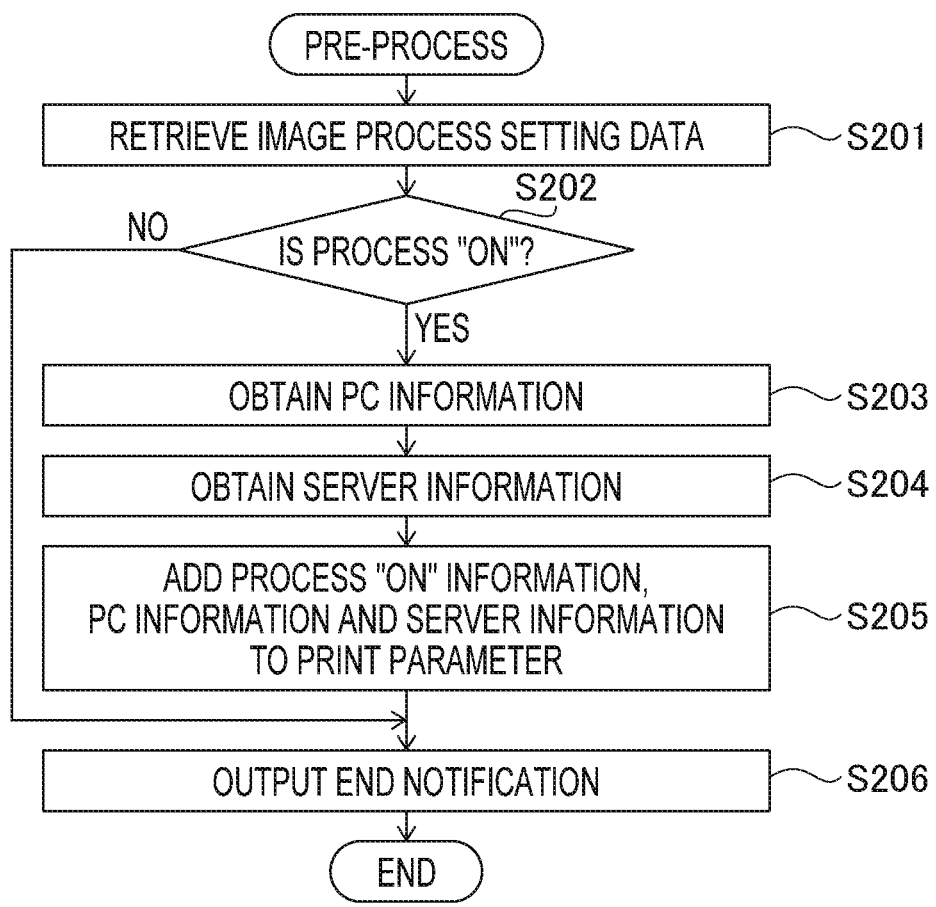
FIG. 7 is a flowchart illustrating a pre-process according to a first embodiment of the present disclosures.

Next, the pre-process according to the first embodiment will be described, referring to a flowchart shown in FIG. 7. In the pre-process, the supporting program 42 retrieves the image process setting data 45 store in the memory 12 (S201). The process in S201 is an example of an obtaining process. In the image process setting data 45, as shown in FIG. 4, the process "ON/OFF" information 452 and the server information 453 are stored in association with each printer. The supporting program 42 retrieves, in S201, the information corresponding to the printer 3, which is the printer obtained in S101 of the printing process, from the image process setting data 45.

Then, the supporting program 42 determines whether "ON" is set to the process "ON/FF" information 452 based on the retrieved information. When it is determined that "ON" is set to the process "ON/OFF" information 452 (S202: YES), the supporting program 42 obtains the PC information which is the information of the PC itself from the OS 21 (S203). Further, the supporting program 42 retrieves the server information from the image process setting data 45 (S204).

Then, the supporting program 42 adds the process "ON" information, the PC information obtained in S203 and the server information obtained in S204 to the print parameter (S205, arrow D in FIG. 5). It is noted that the process in S205 is an example of a first adding process. It is noted that, in S205, the supporting program 42 may further add the printer information identifying the printer 3 to the print parameter. After execution of S205, or when it is determined that the process "ON" information has not been set (S202: NO), the supporting program 42 notifies end or process (S206, arrow E in FIG. 5), and terminates the pre-process.

Returning to FIG. 6, the OS 21 determines whether the supporting program 42 receives the end notification (S105). The end notification is output by the supporting program 42 when the pre-process in accordance with the supporting program 42 is finished. When it is determined that the end notification has not been received (S105: NO), the OS 21 pauses until the end notification is received.

When it is determined that the end notification is received (S105: YES), or when it is determined that the supporting program 42 does not exist (S102: NO), the OS 21 generates the print data with use of the general-use printing program 41 (S106, arrow F in FIG. 5). Further, the OS 21 transmits the generated print data and the print parameter to the designated printer (S107, arrow G in FIG. 5) and terminates the printing process.

When the printer 3 has received the print data and if the process "ON" information has been added to the print parameter, the printer 3 performs a transferring process of transferring the print data to the server 5 and the printing process of receiving the processed data from the server 5 and performing printing based on the received processed data. Specifically, the printer 3 transfers the received print data and the print parameter to the server 5 which is identified by the server information included in the print parameter (arrow I in FIG. 5).

When the process "ON" information has not been added to the received print parameter, the printer 3 does not transfer the print data received from the PC 1 to the server 5, but performs printing, based on the print data received from the PC 1, with use of the printing device 34 (arrow M in FIG. 5).

When receiving the print data from the printer 3, the server 5 obtains the PC information and the printer information from the information added to the print parameter of the received print data, and retrieves the process type 523 corresponding to the PC information and the printer information by referring to the image process DB 52 stored in the memory of the server 5. Then, the server 5 applies the image processing designated by the process type 523 to the received print data (arrow J in FIG. 5). It is noted that, when the image processing using a plurality of pieces of image data such as the N-up process is designated, the server 5 performs the image processing after the necessary number of pieces of image data have been received. Thereafter, the server 5 transmits the processed data to the printer 3 which is the transmission source of the received print data (arrow K in FIG. 5).

The printer 3 performs printing using the printing device 34 based on the processed data received from the server 5 (arrow L in FIG. 5). It is noted that the process "ON" information is not included in the print parameter of the processed data. For example, the printer 3 deletes the process "ON" information from the print parameter before transmitting the print data to the server 5. Alternatively, the server 5 deletes the process "ON" information from the print parameter before transmitting the processed data to the printer 3. Since the process "ON" information is not added to the print parameter of the received processed data, the printer 3 performs printing based on the processed data.

It is noted that the PC information may be added to the print parameter by the printer 3, instead of by the PC 1, before the print data is transmitted to the server 5. Concretely, the supporting program 42 may not add the PC information to the print parameter in S205 of the pre-process, while the printer 3 may add the PC information to the print parameter after the print data is received from the OS 21, and then the printer 3 may transfer the same to the server 5. The printer 3 may be configured to obtain the PC information based on, for example, the communication protocol, when the printer 3 receives the print data and the like from the PC 1.

Further, the supporting program 42 may be configured not to add the printer information to the print parameter in S205 of the pre-process, while the printer 3 may add the information of the printer 3 itself to the print parameter after receiving the print data from the OS 21 and transmit the print data to which the printer information has been added to the server 5. Alternatively, the server 5, which has received the print data, may obtain the printer information based on, for example, the communication protocol and the like.

It is noted that, regarding the PC information 521 and the printer information 522 of the image process DB 52 stored in the server 5, only one of the same may be stored in the server 5. The server 5 may be configured to perform the same image processing regardless of the transmission source of the printer if printing is performed under control of a particular PC (e.g., the PC 1). In such a case, the PC information 521 is an example of transmission source identifying information. Alternatively, the server 5 may be configured to perform the same image processing regardless the outputting source of the PC's if the print data is transmitted from a particular printer (e.g., the printer 3). In this case, it is not necessary that the PC or the printer is configured to add the PC information to the print parameter. In such a case, the printer information 522 is an example of transmission source identifying information.

Further, a server to perform the image processing is determined in advance for each printer. For example, each printer may store server information indicating a server, which is a transmission destination of the print data, in a memory of the printer itself. When, for example, there exists only a single server, each printer may store, in advance, the server information of the single server as the transmission destination of the print data in the memory. In such a case, the printer may be configured to transfer the print data to the single server regardless of the PC from which the print data is received. Further, in such a case, it is not necessary that the PC adds the server information to the print parameter.

As described in detail above, with the print system 100 according to the first embodiment, even if the general-use printing program 41, which is an OS-standard printing program, is not compliant to the image processing to process images and the PC 1 outputs unprocessed image data, the printer 3 transfers the unprocessed image data to the server 5. Then, the server 5 identifies the image processing to be performed based on at least one of the information of the PC 1 and the information on the printer 3 and then based on the image process DB 52, applies the image processing as identified to the unprocessed image data, and transmits the processed data, which is the processed print data, to the printer 3. Accordingly, the image processing by the printer 3 becomes unnecessary, and the image to which the image processing has been applied, can be printed by the printer 3 even if the hardware specification (e.g., a memory capacity) of the printer 3 is insufficient.

Next, a print system according to a second embodiment will be described in detail, referring to the accompanying drawings. The print system according to the second embodiment has the hardware configuration similar to that of the first embodiment, and only a part of process according to the supporting program 42 is different. The configurations and processes similar to those of the first embodiment are assigned with the same reference numbers/steps numbers and detailed description thereof will be omitted.

Figure 6:
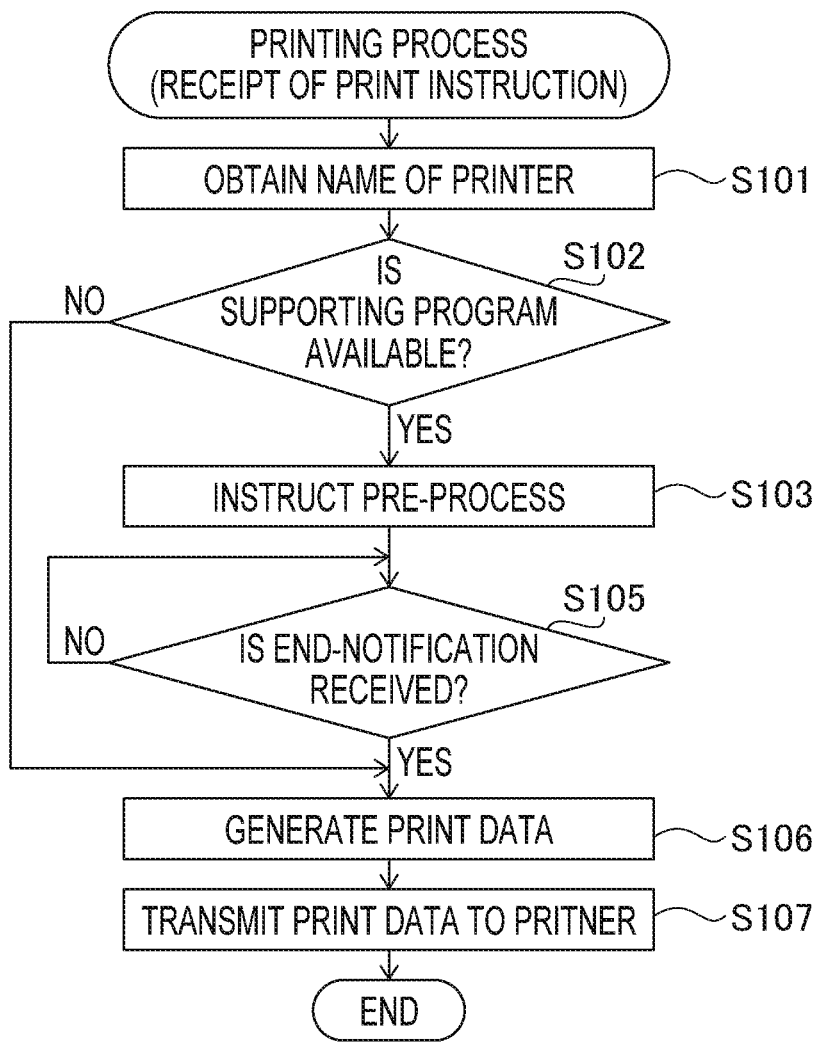
FIG. 6 is a flowchart illustrating a printing process according to the embodiment.
Figure 8:
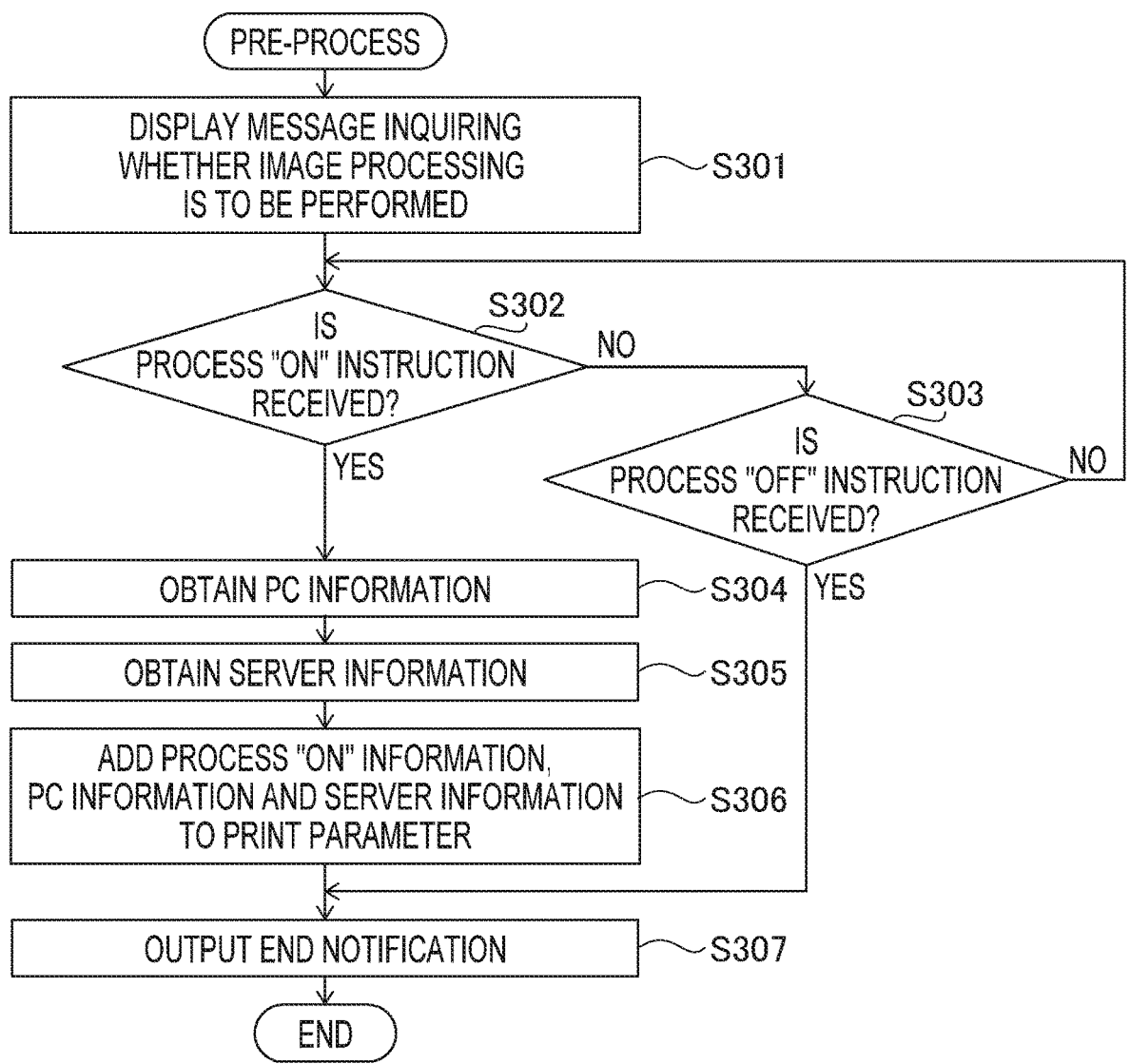
FIG. 8 is a flowchart illustrating a pre-process according to a second embodiment of the present disclosures.

The printing process according to the second embodiment is substantially the same as the printing process according to the first embodiment shown in FIG. 6. Only a part of the pre-process executed in S103 of FIG. 6 (i.e., the pre-process) is different from that of the first embodiment. Hereinafter, the pre-process according to the second embodiment will be described, referring to a flowchart shown in FIG. 8.

In the pre-process according to the second embodiment, the supporting program 42 initially displays, on the UI 13, a message asking the user as to whether the image processing is to be performed (S301), and receives the user's input of an instruction. That is, according to the second embodiment, the supporting program 42 receives the user instruction instead of retrieval of the image process setting data 45 from the memory 12 and obtaining of the ON/OFF state of process as in the first embodiment.

Then, the supporting program 42 determines whether of the process "ON" instruction which instructs to perform image processing is received (S302). When it is determined that the input is not received (S302: NO), the supporting program 42 determines whether the input of the process "OFF" instruction instructing not to perform the image processing is received (S303). When it is determined that no instruction is received (S303: NO), the supporting program 42 returns to S302 and awaits until input of the process "OFF" instruction or the process "OFF" instruction is received. It is noted that the processes in S302 and S303 are examples of a receiving process.

When it is determined that input of the process "ON" instruction is received (S302: YES), the supporting program 42 obtains the PC information, which is the information of the PC itself, from the OS 21 (S304). Further, the supporting program 42 retrieves the server information 453 from the image process setting data 45 (S305). Then, the supporting program 42 adds the process "ON" information, the PC information obtained in S304 and the server information obtained in S305 to the print parameter (S306). The process in S306 is an example of a second adding process. In S306, the supporting program may further add printer information identifying the printer 3. It is noted that the processes in S304-S306 are the same as S203-S205 of the preprocess according to the first embodiment.

After execution of S306 or when it is determined that input of the process "OFF" instruction is received (S303: YES), the supporting program 42 notifies end of pre-process (S307) and terminates the pre-process.

According to the second embodiment, every time when the print instruction is received, the user's input instructing whether or not the image process is to be performed is received. Accordingly, it is not necessary to store the information indicating the process "ON/OFF" information in the image process setting data 45.

As described above, with the print system 100 according to the second embodiment, by inquiring the user whether the image processing is to be performed every time when the print instruction is made, it is possible to choose whether the image processing is performed or not at each job, thereby usability of the print system being improved.

Next, the print system according to a third embodiment will be described, referring to the accompanying drawings. The print system according to the third embodiment has the same hardware configuration as that of the first embodiment, and only part of information stored in the printer or the server is different. In the following description, the configurations and processes same as those of the first embodiment are assigned with the same reference numbers and step numbers and description thereof will be omitted.

With the print system according to the third embodiment, part of the information stored in the image process DB 52 stored in the server 5 is stored in the printer 3 or the printer 4. For example, the printer 3 and the printer 4 have, as shown in FIG. 9, a process setting DB 61 which stores the PC information and the process types in an associated manner. Further, the server 5 has a process DB 62 which stores, as shown in FIG. 10, information indicating the process type, the image process program of the image processing and the image data necessary for the image processing in an associated manner.

According to the third embodiment, the PC 1 performs the printing process and the pre-process which are the same as those of the first embodiment. When the process "ON/OFF" information 452 is set to process "ON," the PC 1 adds the process "ON" information, the PC information and the server information to the print parameter and transmits the same to the printer 3.

When the printer, which receives the print data, determines that the process "ON" information has been set to the print parameter, the printer refers to the process setting DB 61 and retrieves the information indicating the process type which is stored in association with the PC information indicating the PC which is the transmission source of the print data. Then, the printer adds information on the retrieved process type to the print parameter, and transfers the print data and the print parameter to the server which is indicated by the server information of the print parameter.

The server 5 refers to the process DB 62 and obtains the process type of the image processing based on the information included in the received print parameter. The server 5 applies the image processing of the obtained type to the received print data and transmits the processed data (i.e., the processed print data) to the printer.

As described in detail above, with the print system 100 according to the third embodiment, the image processing can be performed by the server, and the printer performs printing based on the processed data which is the print data after the image processing has been applied by the server. Accordingly, the hardware specification (e.g., the memory capacity of the printer) of the printer is insufficient, the image, which has been processed by the server, can be printed by the printer.

Next, referring to the accompanying drawings, a print system according to a fourth embodiment will be described. The print system according to the fourth embodiment has the hardware configuration which is the same as that of the first embodiment. It is noted that the print system according to the fourth embodiment is configured such that the image processing is applied to the print data transmitted from the PC 1 in which the supporting program 42 is not installed. In the following description regarding the fourth embodiment, the configurations and processes same as those of the first embodiment are assigned with the same reference numbers and step numbers and description thereof will be omitted.

It is noted that the PC 1 according to the fourth embodiment does not perform the pre-process. In other words, a printing process according to the fourth embodiment is the same as the printing process according to the first embodiment (see FIG. 6) except that steps S102, S103 and S105 have been omitted. That is, the PC 1 according to the fourth embodiment is configured such that, when receiving the print instruction, the PC 1 generates the print data with use of the general-use printing program 41 and transmits the generated print data as it is (i.e., without adding information to the print parameter) to the printer.

In the print system according to the fourth embodiment, the server 5 stores, for example, image process DB 53 shown in FIG. 11 instead of the image process DB shown in FIG. 2. In the image process DB 53, in addition to respective pieces of information stored in the image process DB 52, the process "ON/OFF" information 531 is stored. Further, according to the fourth embodiment, for each printer, a server which is to perform the image processing is set in advance.

Figure 12:
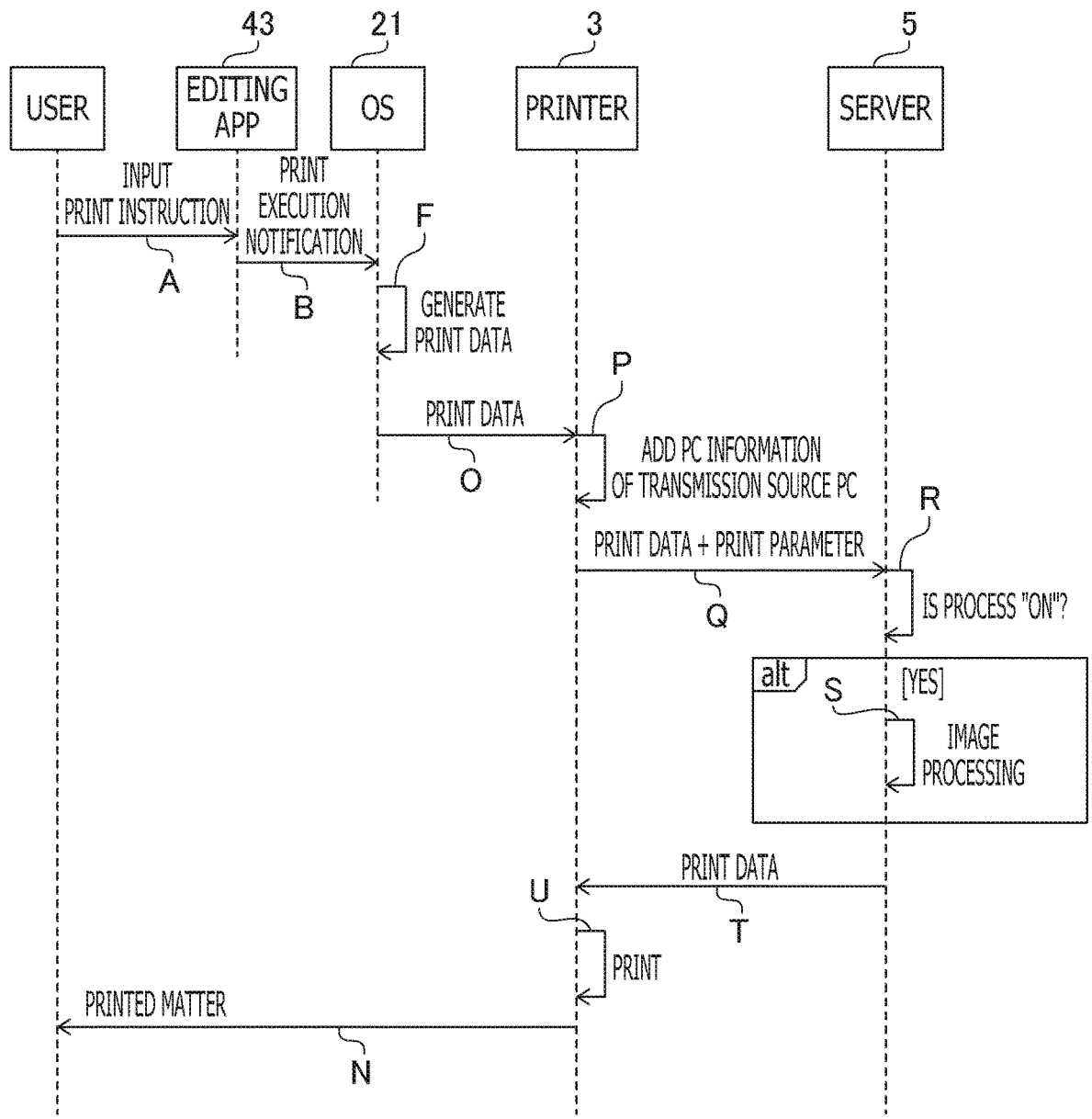
FIG. 12 is a sequence chart indicating an example of an operation of each device according to a fourth embodiment of the present disclosures.

Operations of respective devices when the printing is performed by the print system according to the fourth embodiment will be generally described, referring to a sequence chart shown in FIG. 12. It is noted that, in FIG. 12, processes the same as those in FIG. 5 are assigned with the same reference letters.

As shown in FIG. 12, the editing APP 43 receives input of the print instruction (arrow A), and delivers a print execution notification to the OS 21 (arrow B). The OS 21 generates the print data, with use of the general-use printing program 41, based on the image data (arrow F), and transmits the generated print data to the printer 3 (arrow O).

When receiving the print data, the printer 3 determines the PC of the transmission source, then adds the PC information to the print parameter (arrow P). Then, the printer 3 transfers the print data and the print parameter to the server 5 which has been set, in advance, as a server to which the printer 3 transmits the print data and the print parameter (arrow Q).

The server 5 determines the printer of transmission source of the print data, and obtains the PC information included in the print data and the process "ON/OFF" information 531 corresponding to the determined printer information with reference to the image process DB 53 (arrow R). When it is determined that the process "ON" is set, the server refers to the image process DB 53 and performs the image processing of the process type 523 which is set in correspondence with the PC information and the printer information (arrow S). Further, the server 5 transmits the processed print data to the printer 3 (arrow T).

When the process "ON" is not set to the process "ON/OFF" information 531, the server 5 does not perform the image processing, and transmits the received print data as it is (arrow T). The printer 3 performs printing based on the print data received from the server 5 (arrow U), thereby printed matter being generated (arrow N).

Similar to the third embodiment, the fourth embodiment may be configured such that the printer has the image process setting DB 61 and the server has the processing DB 62. In such a case, if the process "ON/OFF" information is included in the image process setting DB 61, the printer may determine the process "ON" state or the process "OFF" state based on the information of the PC which is the transmission source of the received print data, and the printer may not transfer the print data when the image processing is not to be performed.

As described in detail above, also with the print system 100 according to the fourth embodiment, the image processing can be performed by the server, and the printer performs only printing based on the processed data which is data having been processed when necessary. Accordingly, even if the hardware specification (e.g., the memory capacity) of the printer is insufficient, the image having been processed can be printed with the printer.

In the first through fourth embodiments, the image processing to be applied to the print data is determined based on the PC information and the printer information. However, if the image processing to be applied is set based on the PC information, a setting intrinsic to each user of the PC is possible, which may enhance usability of the PC. Alternatively, if the image processing to be applied is set based on the printer information, a print setting for the PC's respectively using the printer can be collectively made by an administrator of the printer, which improves usability of the administrator of the printer.

In each embodiment, since the server information is stored in the PC and the server information is added to each piece of the unprocessed print data, the printer can identify the server based on the server information having been added to the unprocessed print data. In this case, in the PC, it is possible to select a server, which is to perform the image processing, from among a plurality of servers. Further, the server information may be stored in the printer in advance so that the printer and the server are associated with each other. In such a case, a process of identifying a server is performed easily.

Further, according to the first embodiment, an execution status (i.e., to execute or not) of the image processing is registered with the image process setting data 45 in advance. Accordingly, whether or not the image processing is to be applied is selectable, which improves usability of the print system.

According to the second embodiment, since whether or not the image processing is to be performed is inquired at every print instruction, selection of whether or not to perform the image processing can be selected for each job, which also improves usability of the print system.

It is noted that the embodiments disclosed in the present specification are only examples and are not intended to limit aspects of the present disclosures. The techniques disclosure in the present specification may be further improved and/or modified without departing from the aspects of the present disclosures. For example, the number of the PC's and/or the number of the servers need not be limited to one as disclosed in the specification or the drawings, but may be any number.

Further, the information stored in the image process DB 52 may be directly set in the server 5 by an administrator of the print system. That is, according to one aspect of the present disclosures, the image process setting APP 44 may be omitted.

For example, the PC may perform the image processing instead of the server. In such a case, after the PC transmits the unprocessed image data to the printer, the PC receives the unprocessed print data from the printer, applies the image processing, which is determined based on the print parameter, and retransmits the processed data to the printer. For example, the programs for respective processes, which are described to be executed by the server in the above-described embodiments, may be installed in the PC and the PC information for identifying the PC may be added to the print parameter instead of the server information.

It is noted that the supporting program 42 adds the PC information, instead of the server information, to the print data in S205 in the first embodiment and in S306 in the second embodiment. In the fourth embodiment, instead of the server, a device which is to perform the image processing is set, in advance, to the PC.

In each of the above-described embodiments, when in the process "OFF" state, no information is added. However, information indicating the process "OFF" state may be added. In such case, only when the information indicating the process "OFF" state is added, the supporting program 42 determines that the process "ON" information has not been added.

Instead of adding information to the print parameter, the supporting program 42 may generates forenotice data including the PC information and the printer information, besides the print data and the print parameter, and may transmit the forenotice data to the server before the print data is transmitted to the printer. In such a case, when the PC information and the printer information indicated by the received forenotice data have been stored in the image process DB 52, the server temporarily stores a fact that the forenotice data is received, and performs the process stored in the image process DB 52 when the print data corresponding to the forenotice data is received.

It is noted that in the flowcharts disclosed in the above-described embodiments, the order of arbitrary plural steps therein may be changed or executed in parallel unless there occur no conflicts by the modification.

It is noted that the process(s) disclosed in each of the embodiments may be performed by a single CPU, a plurality of CPU's, another hardware such as an ASI and/or an arbitrary combination thereof. Further, the processes disclosed in the above-described embodiments may be realized by a recording medium storing instructions realize the programs for performing the processes, methods or any appropriate modes.

What is claimed is:

1. A print system comprising an information processing apparatus, a printer and a server which are interconnected through a network,
  wherein the server has an image processing function of applying image processing to print data, the image processing being a process of changing a mode of a print image represented by the print data, the print image represented by the print data before the image processing is applied having a first mode, the print image represented by the print data after the image processing is applied having a second mode, the first mode being different from the second mode,
  wherein the server stores first identifying information and second identifying information in an associated manner, the first identifying information identifying being information identifying at least one of the printer and the information processing apparatus, the second identifying information being information identifying an image processing to be applied,
  wherein the information processing apparatus connected to the network is configured to transmit unprocessed print data to the printer when a print instruction is received through a printing program, the printing program being a program implemented in an operation system of the information processing apparatus, the print instruction being an instruction causing the printer connected with the information processing apparatus, the unprocessed print data being print data the server has not yet applied the image processing,
  wherein, when the printer connected to the network receives the unprocessed print data from the information processing apparatus, the printer transmits the unprocessed print data to the server,
  wherein, when the server connected to the network receives the unprocessed print data from the printer, the server performs, based on the received unprocessed print data:
    obtaining a transmission source identifying information which identifies a transmission source device, the transmission source device being one of the transmission source printer and the transmission source apparatus, the transmission source printer being a printer which transmitted the unprocessed print data to the server, the transmission source apparatus being an information processing apparatus which transmitted the unprocessed image data to the transmission source printer;
    applying the image processing to the unprocessed print data, the image processing corresponding to the second identifying information, the second identifying information being information stored in the server, the second identifying information being information associated with the first identifying information, the first identifying information being information identifying a device same as the transmission source device identified by the transmission source identifying information obtained by the server; and
    transmitting processed print data to the printer, the processed print data being the print data to which the image processing has been applied, and
  wherein, when the printer connected to the network receives the processed print data form the server, the printer performs printing based on the processed print data.

2. The print system according to claim 1,
  wherein the first identifying information is for identifying the information processing apparatus,
  wherein the information processing apparatus is configured to receive the second identifying information through a user interface of the information processing apparatus and transmit the received second identifying information to the server,
  wherein, when the server receives the second identifying information from the information processing apparatus, the server stores the second identifying information as received in association with the first identifying information identifying the information processing apparatus,
  wherein, when the printer receives the unprocessed image data from the information processing apparatus, the printer transfers the unprocessed print data with adding the transmission source identifying information identifying the information processing apparatus, the information processing apparatus being the transmission source of the unprocessed print data to the server, and
  wherein, when the server receives the unprocessed print data from the printer, the server obtains the transmission source identifying information identifying the information processing apparatus based on the received unprocessed print data and applies the image processing corresponding to the second identifying information associated with the first identifying information identifying the device same as the device identified by the transmission source identifying information to the unprocessed print data.

3. The print system according to claim 1,
  wherein the first identifying information is information identifying the printer, and
  wherein, when the server receives the unprocessed print data from the printer, the server obtains transmission source identifying information identifying a printer, the printer being a transmission source of the unprocessed print data based on the received unprocessed print data and applies the image processing corresponding to the second identifying information associated with the first identifying information, the first identifying information being a device same as a device identified by the received transmission source identifying information to the unprocessed print data.

4. The print system according to claim 1,
  wherein the printer stores server information necessary to communicate with the server connected with the printer through the network, and
  wherein, when the printer receives the unprocessed print data from the information processing apparatus, the printer is configured to transmit the unprocessed print data to the server using the server information.

5. The print system according to claim 1,
  wherein the information processing apparatus is configured to store server information, the server information being necessary to communicate with the server connected with the information processing apparatus through the network,
  wherein, when the information processing apparatus receives the print instruction to cause the printer to perform printing through the print program, the information processing apparatus obtains the server information from the memory, adds the server information as obtained to the unprocessed print data and transmits the unprocessed print data to the printer, and wherein, when the printer receives the unprocessed print data from the information processing apparatus, the printer transfers the unprocessed print data to the server using the server information added to the unprocessed print data.

6. The print system according to claim 1, wherein the information processing apparatus is configured to store process applying information indicating whether or not image processing it to be applied to print data, wherein, when the information processing apparatus receives the print instruction to cause the printer to perform printing through the printing program, the printing program not being compliant to the image processing, the information processing apparatus obtains the process applying information from the memory and adds process requesting information indicating that the image processing is to be applied to the unprocessed print data, and wherein, when process requesting information is added to the unprocessed print data, the printer transfers the print data to the server, while when the process requesting information is not added to the unprocessed print data, the printer performs printing based on the unprocessed print data.

7. The print system according to claim 6, wherein instructions realizing a supporting program are stored in a non-transitory computer-readable storage provided to the information processing apparatus, the instructions cause, when executed by the controller, the information processing apparatus to perform:

when the print instruction causing the printer to perform printing is received through the print program, an obtaining process of obtaining the process applying information from the memory; and when the process applying information as obtained indicates image processing, a first adding process of adding the process requesting information to the print parameter of the unprocessed print data.

8. The print system according to claim 7, wherein the operating system is configured to detect print instruction causing the printer to perform printing through the printing program and output a detection notification notifying detection of the print instruction before transmitting print data corresponding to the detected print instruction to the printer, and wherein, when the detection notification is output, the instructions cause, when executed by the controller, the information processing apparatus to perform the obtaining process.

9. The print system according to claim 1, wherein, the information processing apparatus is configured to such that, when the information processing apparatus receives the print instruction to cause the printer to perform printing through the printing program, the printing program not being compliant to the image processing is received, the information processing apparatus receives a further instruction instructing an image processing is applied to print data through a user interface of the information processing apparatus, wherein, when the further instruction instructs to perform image processing, the information processing apparatus adds process requesting information indicating application of the image processing to the unprocessed image data, and wherein, when the process requesting information is added to the unprocessed image data, the printer transfers the unprocessed print data to the server, while when the process requesting information is not added to the unprocessed image data, the printer performs printing based on the unprocessed print data.

10. The print system according to claim 9, wherein instructions realizing a supporting program are stored in a non-transitory computer-readable storage, the supporting program being installed in the operating system of the information processing apparatus, wherein the instructions cause, when executed by the controller, the information processing apparatus to perform:

when the print instruction causing the printer to perform printing through the printing program is received, a receiving process of receiving a user input indicating whether or not an image processing is to be applied to print data through the user interface; and when the input indicating the image processing is to be applied is received in the receiving process, a second adding process to add the process requesting information to a print parameter of the unprocessed print data.

11. The print system according to claim 10, wherein the operating system is configured to detect print instruction causing the printer to perform printing through the printing program and output a detection notification notifying detection of the print instruction before transmitting print data corresponding to the detected print instruction to the printer, and wherein, when the detection notification is output, the instructions cause, when executed by the controller, the information processing apparatus to perform the receiving process.

12. The print system according to claim 7, wherein another supporting program, which is compliant to a printer different from the printer, realized by other instructions is installable in the operating system, the information processing apparatus storing identification information and printer information in an associated manner for each support program installed in the operating system, and wherein the operating system performs a process represented by the support program indicated by the identification information associated with the printer information of the printer subjected to the print instruction.

13. The print system according to claim 1, wherein the server is configured to store image data; and wherein the image processing includes a synthesizing process of synthesizing the image data stored in the server with the unprocessed print data.

14. The print system according to claim 1, wherein the server is configured to store the unprocessed print data containing a plurality of pages of images received from the printer; and wherein the image processing includes an aggregation process aggregating the plurality of images represented by the unprocessed image data by reducing and arranging in one page of image to generate processed image data.

15. The print system according to claim 1,
wherein the image processing includes a dividing process of dividing one page of image represented by the unprocessed image data and enlarging each of divided images to generate a plurality of pieces of processed print data respectively representing the divided and enlarged images.

16. A print system, comprising:
an information processing apparatus;
a printer;
a server, the information processing apparatus, the printer and the server being mutually connected through a network,
wherein the server has a processing function of applying image processing to print data, the image processing being a process of changing a mode of a print image represented by the print data, the print image represented by the print data before the image processing applied having a first mode, the print image represented by the print data after the image processing is applied having a second mode, the first mode being different from the second mode,
wherein the printer is configured to store first identifying information and second identifying information in an associated manner, the first identifying information being information used to identify the information processing apparatus, the second identifying information being information used to identify the image processing to be applied,
wherein the information processing apparatus connected to the network is configured to transmit unprocessed print data to the printer when a print instruction is received through a printing program, the printing program being a program implemented in an operation system of the information processing apparatus, the print instruction being an instruction causing the printer connected with the information processing apparatus, the unprocessed print data being print data the server has not yet applied the image processing,
wherein, when the printer connected to the network receives the unprocessed print data from the information processing apparatus, the printer:
 obtains transmission source identifying information identifying the information processing apparatus based on the unprocessed print data, the information processing apparatus being a transmission source of the unprocessed print data;
 adds the second identifying information associated with the first identifying information to the unprocessed print data, the first identifying information being information identifying a device same as a device identified by the obtained transmission source identifying information; and
 transmits the unprocessed print data to the server, the second identifying information being added the unprocessed print data being data,
wherein, when the server connected to the network receives the unprocessed print data to which the second identifying information is added from the printer, the server:
 applies the image processing corresponding to the added second identifying information to the unprocessed print data; and
 transmits processed print data, the processed print data being the print data to which the image processing has been applied, and
wherein, when the printer connected to the network receives the processed print data from the server, performs printing based on the processed print data.

17. A printer configured to be connected to a network, comprising:
a communication interface;
a printing device; and
a controller,
wherein the controller is configured such that:
 when the controller receives, through the interface, print data to which process requesting information is added from an information processing apparatus, the information processing apparatus being connected to the network, the controller performs a transferring process, the transferring process being a process of transferring, through the communication interface, the received print data to a server, the server being connected to the network, the process requesting information indicating application of image processing, the image processing being a process of changing a mode of an image represented by the print data, the image represented by the print data before the image processing is applied having a first mode, the image represented by the print data after the image processing is applied having a second mode, the second mode being different from the first mode,
 an operating system of the information processing apparatus having a printing program, the printing program being implemented in the operating system in advance,
 the print data print data being data generated by the printing program in response to the information processing apparatus receiving a print instruction through the printing program, the print instruction being an instruction causing the printer to perform printing,
 the server having an image processing function of applying the image processing to the print data,
 the server storing first identifying information and second identifying information in an associated manner, the first identifying information being information identifying at least one of the printer and the information processing apparatus, the second identifying information being information identifying the image processing to be applied,
 wherein, when the server receives the print data from the printer, the server obtains transmission source identifying information, the transmission source identifying information being information identifying at least one of the printer and the information processing apparatus, the printer being a transmission source of the print data, the information processing apparatus being an apparatus supplying the print data to the printer,
 the server applying the image processing corresponding to the second identifying information, the second identifying information being associated with the first identifying information, the first identifying information being information identifying a device same as the device identified by the transmission source identifying information, the transmission source identifying information being obtained by the server, and
wherein the controller is further configured such that:
 when the processed print data is received through the communication interface, the processed print data being data to which the image processing has been applied by the server the controller performs a printing process, the printing process being a process of causing the printing device to perform printing based on the processed print data.

18. A printer configured to be connected to a network, comprising:
a communication interface;
a printing device;
a memory; and
a controller,
wherein the memory is configured to store first identifying information and a second identifying information in an associated manner, the first identifying information being information identifying an information processing apparatus, the second identifying information being information identifying image processing to be applied,
wherein the controller is configured such that:
when the controller receives print data from the information processing apparatus connected to the network through the communication interface, process requesting information being added to the print data:
the controller obtains transmission source identifying information identifying the information processing apparatus based on the print data, the information processing apparatus being a transmission source of the print data, the process requesting information indicating application of image processing, the image processing being a process of changing a mode of an image represented by the print data, the image represented by the print data before the image processing is applied having a first mode, the image represented by the print data after the image processing is applied having a second mode, the second mode being different from the first mode,
the controller adds the second identifying information to the print data, the second identifying information being associated with the first identifying information, the first identifying information identifying a device same as the device identified by the transmission source identifying information,
the controller performs a transferring process of transferring the print data to a server connected to the network through the communication interface, the second identifying information has been added to the print data,
the operating system of the information processing apparatus having a printing program, the printing program being implemented in the operating system in advance,
the print data being data generated by the printing program in response to the information processing apparatus receiving a print instruction through the printing program, the print instruction being an instruction causing the printer to perform printing,
the server having an image processing function of applying image processing to the print data,
the server being configured to apply, in response to receipt of the print data from the printer, the image processing to the print data, the image processing corresponding to the second identifying information added to the print data, and
wherein the controller is further configured such that:
when the processed print data is received through the communication interface, the image processing having been applied to the print data by the server, the controller performs a printing process of causing the printing device to perform printing based on the processed print data.

19. A non-transitory computer-readable recording medium containing instructions realizing a supporting program corresponding to a printer, the printer being connected to an information processing apparatus through a network, an operating system of the information processing apparatus having a printing program as a program implemented in the operating system, the information processing apparatus storing image processing information in a memory of the image processing apparatus, image processing information indicating whether image processing is to be applied to print data, the printer being connected, through the network, to a server having a function of applying image processing, the image processing being a process of changing a mode of a print image represented by the print data, the image represented by the print image data before the image processing is applied having a first mode, the print image represented by the print data after the image processing is applied having a second mode, the second mode being different from the first mode, the printer transferring the print data to the server when process requesting information is added to the received print data, the process requesting information indicating that the image processing is to be applied, the server storing first identifying information and second identifying information in an associated manner, the first identifying information identifying at least one of the printer and the information processing apparatus, the second identifying information identifying the image processing to be applied, the server obtaining transmission source identifying information identifying at least one of the printer and the information processing apparatus, the printer being a transmission source of the print data, the information processing apparatus supplying the print data to the printer when the server receives the print data from the printer, the server being configured to apply the image processing corresponding to the second identifying information, the second identifying information being associated with the first identifying information identifying a device same as a device identified by the obtained transmission source identifying information,
wherein the instructions cause, when executed by the controller, the information processing apparatus to perform:
when the information processing apparatus receives a print instruction to cause the printer to perform printing through the print program, an obtaining process of obtaining the image processing information from the memory; and
when the image processing information obtained in the obtaining process indicates the image processing process, a first adding process of adding the process requesting information to a print parameter of print data corresponding to the print instruction.

20. A non-transitory computer-readable recording medium containing instructions realizing a supporting program corresponding to a printer, the printer being connected to an information processing apparatus through a network, an operating system of the information processing apparatus having a printing program as a program implemented in the operating system, the printer being connected, through the network, to a server having a function of applying image processing, the image processing being a process of changing a mode of a print image represented by the print data, the print image represented by the print data before the image processing is applied having a first mode, the print image represented by the print data after the image processing is applied having a second mode, the second mode being different from the first mode, the printer transferring the print data to the server when process requesting information is added to the received print data, the process requesting information indicating that the image processing is to be applied, the server storing first identifying information and second identifying information in an associated manner, the first identifying information identifying at least one of the printer and the information processing apparatus, the second identifying information identifying the image processing to be applied, the server obtaining transmission source identifying information, the transmission source identifying information identifying at least one of the printer which is a transmission source of the print data and the information processing apparatus, the information processing apparatus supplying the print data to the printer when the server receives the print data from the printer, the server being configured to apply the image processing corresponding to the second identifying information, the second identifying information associated with the first identifying information identifying a device same as a device identified by the obtained transmission source identifying information, wherein the instructions cause, when executed by the controller, the information processing apparatus to perform:

when the information processing apparatus receives a print instruction to cause the printer to perform printing through the print program, a receiving process of receiving whether an image processing process is to be applied to print data through a user interface of the information processing apparatus, and when applying image processing is received in the receiving process, a second adding process of adding the process requesting information to a print parameter of print data corresponding to the print instruction.

21. A non-transitory computer-readable recording medium containing instructions realizing a supporting program corresponding to a printer, the printer being connected to an information processing apparatus through a network, an operating system of the information processing apparatus having a printing program as a program implemented in the operating system, the information processing apparatus storing image processing information in a memory of the image processing apparatus, image processing information indicating whether image processing is to be applied to print data, the printer being connected, through the network, to a server having a function of applying image processing, the image processing being a process of changing a mode of a print image represented by the print data, the image represented by the print image data before the image processing is applied having a first mode, the print image represented by the print data after the image processing is applied having a second mode, the second mode being different from the first mode, the server storing first identifying information and second identifying information in an associated manner, the first identifying information identifying the information processing apparatus, the second identifying information identifying the image processing to be applied, the printer obtaining transmission source identifying information identifying the information processing apparatus based on the print data when process requesting information indicating an image processing process is added to the received print data, the information processing apparatus being a transmission source of the print data, the printer adding the second identifying information associated with the first identifying information, the first identifying information identifying a device same as a device identified by the obtained transmission identifying information to the print data, the printer transmitting the print data to the server, the second identifying information being added to the print data, wherein, when receiving the print data from the printer, the server applies the image processing corresponding to the added second identifying information to the print data, wherein the instructions cause, when executed by the controller, the information processing apparatus to perform:

when the information processing apparatus receives a print instruction to cause the printer to perform printing through the print program, an obtaining process of obtaining the image processing information from the memory; and when the image processing information obtained in the obtaining process indicates the image processing process, a first adding process of adding the process requesting information to a print parameter of print data corresponding to the print instruction.

22. A non-transitory computer-readable recording medium containing instructions realizing a supporting program corresponding to a printer, the printer being connected to an information processing apparatus through a network, an operating system of the information processing apparatus having a printing program as a program implemented in the operating system, the printer being connected, through the network, to a server having a function of applying image processing, the image processing being a process of changing a mode of a print image represented by print data, the print image represented by the print image data before the image processing is applied having a first mode, the print image represented by the print image data after the image processing is applied having a second mode, the second mode being different from the first mode, the server storing first identifying information and a second identifying information in an associated manner, the first identifying information identifying the information processing apparatus, the second identifying information identifying the image processing to be applied, the printer obtaining transmission source identifying information identifying the information processing apparatus based on the print data when process requesting information indicating an image processing process is added to the received print data the information processing apparatus being a transmission source of the print data, the printer adding the second identifying information associated with the first identifying information, the first identifying information identifying a device same as a device identified by the obtained transmission identifying information to the print data, the printer transmitting the print data to the server, the second identifying information being added to the print data, the server applying the image processing corresponding to the added second identifying information to the print data when receiving the print data to which the second identifying information from the printer, wherein the instructions cause, when executed by the controller, the information processing apparatus to perform:

when the information processing apparatus receives a print instruction to cause the printer to perform printing through the print program, a receiving process of receiving whether image processing is to be applied to print data through a user interface of the information processing apparatus; and when applying image processing is received in the receiving process, a second adding process of adding the process requesting information to a print parameter of print data corresponding to the print instruction.

* * * * *